UNITED STATES PATENT OFFICE.

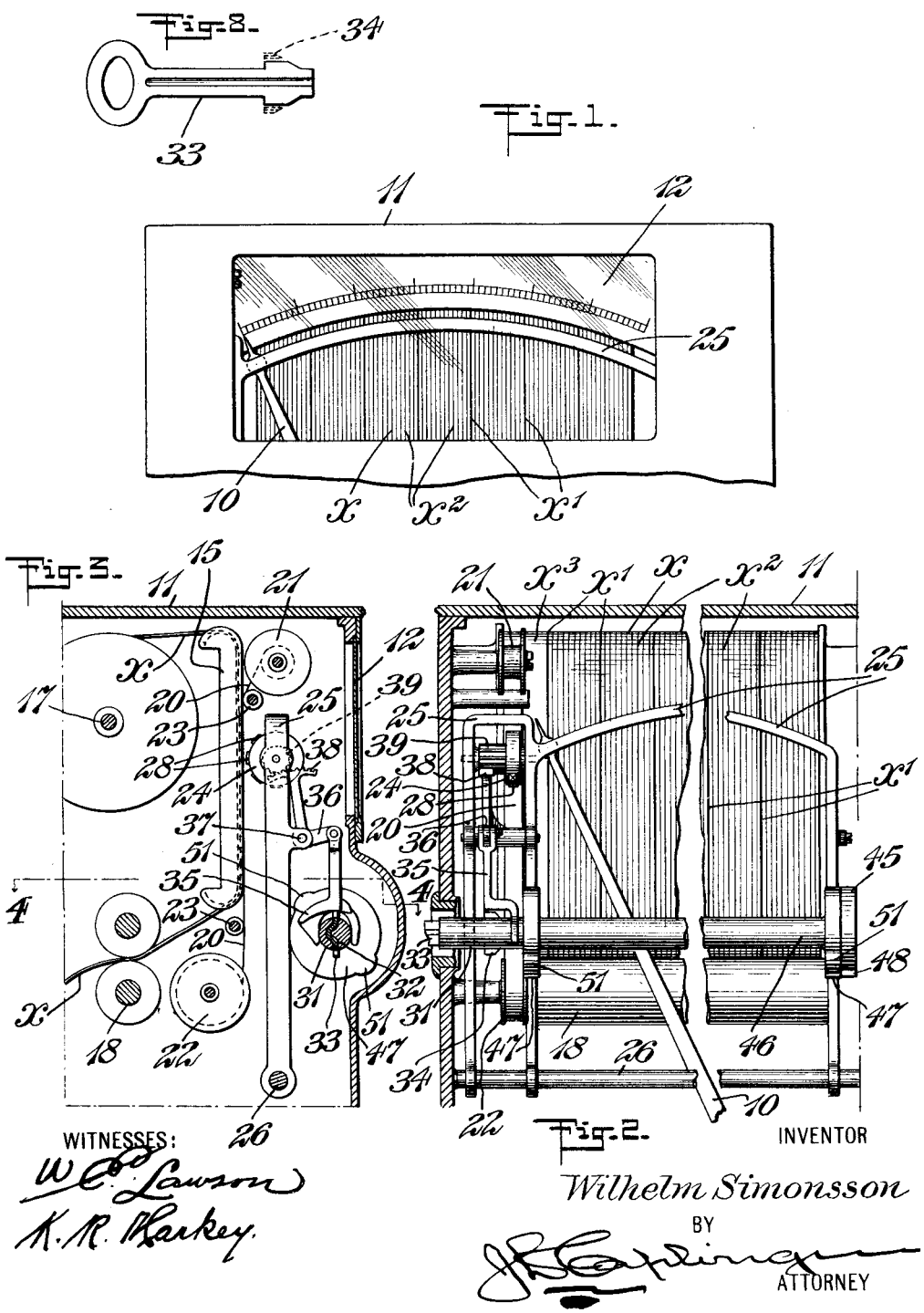

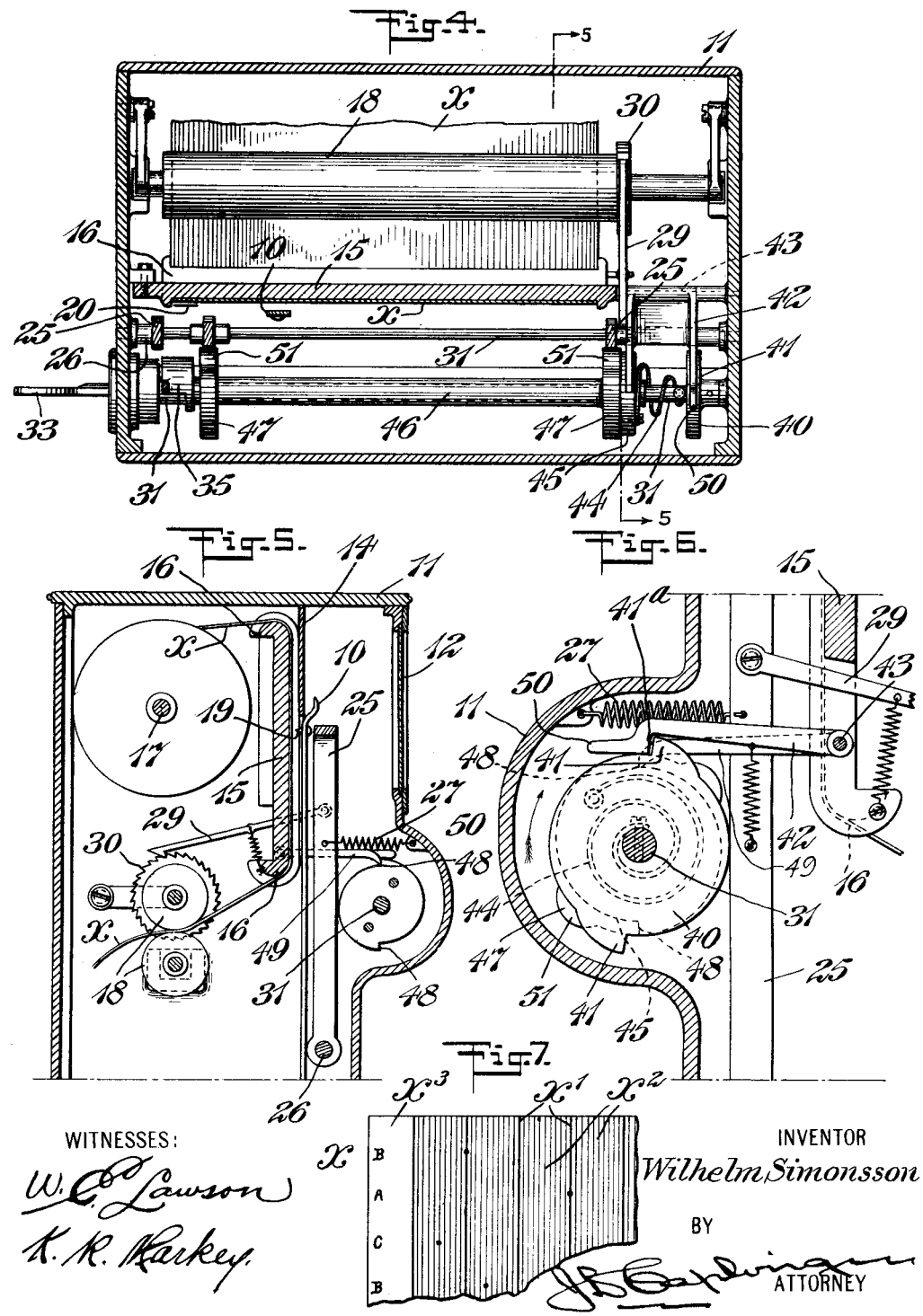

WILHELM SIMONSSON, OF NEW YORK, N. Y.

RECORDING MECHANISM.

1,124,820.  Specification of Letters Patent.  Patented Jan. 12, 1915.

Application filed May 21, 1910. Serial No. 562,737.

*To all whom it may concern:*

Be it known that I, WILHELM SIMONSSON, a subject of the King of Sweden, residing in the city and State of New York, have invented certain Improvements in Recording Mechanisms, of which the following is a specification.

This invention relates to certain improvements in recording mechanisms, and more particularly in that class of such mechanisms which are particularly designed and adapted for use in connection with measuring instruments of various kinds, and the like, for recording successive operations thereof, and the object of the invention is to provide a mechanism of this general character of a simple and comparatively inexpensive nature, and of a compact and strong construction not liable to become readily deranged or broken during use, having certain features of novelty and improvement whereby the recording function is accomplished in an accurate and positive manner such as is designed to afford an effective safeguard against tampering or defective operation due to carelessness or inattention upon the part of the attendant.

The invention consists in certain novel features of the construction, and combinations and arrangements of the several parts of the improved recording mechanism, whereby certain important advantages are attained, and the mechanism is rendered simpler, less expensive and more accurate, and otherwise better adapted and more convenient for use, all as will be hereinafter fully set forth.

The novel features of the invention will be carefully defined in the claims.

In order that my improvements may be the better understood, I will now proceed to describe my invention with reference to the accompanying drawings wherein—

Figure 1 is a view drawn upon a reduced scale, showing one embodiment of my improved recording mechanism in front elevation; Fig. 2 is a sectional view taken vertically through the improved recording mechanism as shown in Fig. 1, the mechanism being viewed in front elevation upon an enlarged scale, and certain parts thereof being omitted for lack of space; Fig. 3 is a sectional view taken vertically through the recording mechanism; Fig. 4 is a sectional view taken horizontally through the improved recording mechanism in the plane indicated by line 4—4 in Fig. 3; Fig. 5 is a vertical sectional view somewhat similar to Fig. 3, but taken through the recording mechanism in the plane indicated by the line 5—5 in Fig. 2; Fig. 6 is an enlarged fragmentary detail view illustrating certain features of construction of the releasable actuating means comprised in my improved recording mechanism and which will be hereinafter referred to; Fig. 7 is a detached detail view showing a fragment of the record sheet shown in the preceding views; and Fig. 8 is a detached detail view showing a key capable of employment for controllably operating the recording mechanism constructed as herein shown.

In these views, the measuring instrument to which I have shown my improved recording mechanism applied for use, and which may be of any type and designed for any desired use, is provided with an index member or pointer 10 mounted for movement and actuated in such a manner that its free extremity is adapted to traverse an arc within a casing 11 of general rectangular form, affording a housing wherein the operative parts of the improved recording mechanism are contained, and provided with a sight aperture 12 at its forward part whereat the operation of the index member or pointer 10 may be viewed, there being a graduated plate 14 extended across the upper part of said casing 11, over which the upper free extremity of said pointer 10 is adapted to play during the operation of the measuring instrument so as to indicate the result thereof. So far as my present invention is concerned, however, the use of such a pointer or index member is immaterial, since the same affords merely one form of actuating connection for operating the recording mechanism in unison with the operation of the instrument to which it is applied for use.

The sight aperture 12 in the casing 11 for the recording mechanism is herein shown covered over with a glass plate or the like, and within said casing, parallel with but spaced at the rear of said glass plate is extended a platen member 15, over which a record strip or tape $x$ is adapted to be fed in a vertical direction in such manner that the upper free end of the index member or pointer 10 may play across its front surface during the operation of the measuring instrument, so as to stand in position corresponding with the result of such operation to produce a record upon said tape or strip, the upper and lower parts of said platen member 15 being rounded, as shown at 16, for the convenient travel of the rearwardly directed upper and lower end portions of the record strip or tape over them from a reel 17 and to a delivery device 18 located at the rear part of the casing as clearly shown in Figs. 3 and 5.

As herein shown the record strip or tape $x$ is provided with longitudinal rulings $x^1$, corresponding in relation with the spacing of the major graduations of the plate 14, and also with intermediate longitudinal rulings $x^2$ which correspond in relative position with the minor or intermediate graduations of said plate 14. These rulings $x^1$ and $x^2$ may obviously be differently colored or distinguished from each other by index characters at intervals along the length of the tape or strip. It will be understood, however, that record strips or tapes of other kinds and their equivalents may be employed without departure from the principles and spirit of the invention.

The free upper extremity of the pointer or index member 10 stands normally at zero of the scale upon the plate 14, and below said plate 14, said pointer 10 is bent rearwardly toward the platen 15, so as to stand closely adjacent to the exposed surface of the ruled record strip $x$, as indicated in Figs. 4 and 5, and at an appropriate point in its length, said index member or pointer 10 is provided with a perforating device or stylus 19 which is adapted to register, in such normal inactive position of the parts, with that one of the vertical or longitudinal rulings $x^1$ of the tape or strip $x$ which corresponds in location and function with the zero graduation upon the plate 14. During the movement of said pointer across the plate 14 in the operation of the measuring instrument in connection with which the improved recording mechanism is used, it will be evident that this perforating device or stylus 19 will be caused to travel across the record sheet or strip $x$ and by reason of the proportionate spacing of the rulings thereof with respect to the graduations of the plate 14, said stylus will be positioned at all times in registry with that one of the rulings $x^1$ or $x^2$ which corresponds with the particular graduation of plate 14 opposite to which the upper extremity of the pointer stands. It will be evident that a pencil or other equivalent device may be substituted for the stylus.

As herein shown the pointer or index member 10 is possessed of sufficient resilience as to assure the retention of the stylus 19 out of contact with the exposed surface of the record tape or strip $x$ during the travel of said pointer across said tape or strip in the operation of the measuring instrument, but permitting such rearward movement of the pointer or index member as is needful to permit its point or stylus 19 to be impressed upon the record strip or sheet in such a manner as to record the successive operations of the measuring instrument, and at the left hand side of the zero ruling $x^1$ of said strip or tape $x$, as seen in Figs. 2 and 7, the tape is provided with a longitudinally extended blank space or column $x^3$, over which travels a vertically directed ink ribbon 20, held at its upper and lower ends upon reels 21 and 22, and having its intermediate portion guided upon idler rolls 23, 23, which operate to direct such intermediate part of the ink ribbon downwardly over the front surface of the tape or strip $x$ in line with said blank space or column $x^3$ thereof.

24 represents a type wheel mounted for rotatory adjusting movement in a yoke 25 comprising connected spaced arms pivotally supported at their lower ends upon a bar or rod 26 extended transversely across the casing 11, and held normally drawn forward from the platen 15 by means of a spring 27 in such a way that the printing surfaces 28, 28 of the type wheel 24 are prevented from contact upon the ink ribbon 20 which is interposed between said printing surfaces of the type wheel and the front surface of the record strip or tape $x$, in such a manner that when said yoke 25 is swung rearwardly against the tension of its spring 27, one or another of the printing surfaces 28 of said type wheel, dependent upon the position to which the same shall have been primarily adjusted, will be pressed upon the ink ribbon in such a manner as to imprint such surface 28 upon the column $x^3$ of the record tape or strip $x$.

The type wheel 24 is positioned for printing contact with the record strip or tape in substantial alinement with the point whereat the stylus 19 is to be impressed upon said strip, so that while said point or stylus may be employed to record the total result of the operation of the measuring instrument to which the improved recording mechanism is applied for use, the type wheel 24 may be employed to similarly record upon said tape or strip the particular person in charge of the measuring instrument at each individual operation thereof, and being capable of employment, by reason of its adjustability, to print and record different numbers or other insignia upon said strip $x$ in case the attendant is changed so that the record strip may be employed to disclose the exact person in charge of the instrument at the time of any individual operation thereof.

As stated above, the yoke or member 25 is operable to actuate both the pointer 10 to impress its stylus 19 upon the record strip and the type wheel 24, to press the printing characters 28 thereof upon said record sheet or strip, and I have also shown means whereby a longitudinal feeding movement of the record strip or sheet may be effected by the movement of this yoke or member 25, so that upon retraction thereof by the spring after each recording impulse, a certain extent of movement may be imparted to said strip $x$ to feed the same over the platen 15 sufficiently to permit the succeeding operation of the measuring instrument to be recorded upon the strip at an appropriate distance from the precedent record. As shown herein, the means for accomplishing this longitudinal feeding movement of said record strip comprises a dog 29 connected with the yoke member 25 and engageable with the teeth of a ratchet wheel 30 connected with one of the delivery rolls 18 so as to impel said rolls to feed the strip endwise between them when the yoke member is retracted by its spring 27.

For controllably operating the yoke member 25 against the tension of its retracting spring 27 I have provided means including a shaft 31 extended horizontally across the forward part of the casing in front of the yoke member and having its opposite ends mounted for rocking movement in the ends of said casing, one end thereof being slotted transversely in an axial direction as shown at 32 so as to be adapted to receive a key or controlling member 33 insertible at an aperture appropriately located in the casing and adapted, when turned, to communicate its movement to rotate said shaft 31. In practice different keys will be issued to different attendants who may be from time to time in charge of the measuring instrument to which my improved recording mechanism is applied, and these keys may be provided with wards or kerfs after the fashion of keys for cylinder and other locks so as to prevent the operation of the recording mechanism except upon the insertion of appropriately formed keys and thereby to guard against tampering with the mechanism by unauthorized persons.

As shown in the drawings, the key 33 is provided with diametrically opposite wards 34, and in the different keys for controllably actuating the recording mechanism these wards will be of graduated lengths, as indicated in dotted lines in Fig. 8, and when said key 33 is inserted in position within the casing as shown in Figs. 2 and 3, and turned, these wards 34 are adapted for engagement upon a tumbler 35, the lower end whereof is guided upon the slotted end of shaft 31, while its upper end has pivotal connection with one arm of a bell crank lever 36, fulcrumed at 37 and having an arm 38 provided with a segmental gear surface meshing with a pinion 39 connected with the type wheel 24, whereby rotatory movement is imparted to said type wheel by the upward movement imparted to the tumbler from the turning of the key in such a way as to cause the appropriate printing surface 28 of said type wheel to stand in position to print upon the column $x^3$ of the record strip when the yoke member 25 is pressed backward in the ensuing operation of the mechanism as will be presently explained. Since the upward movement of the tumbler, and the turning of the type wheel 24 will be commensurate to the projection of the wards 34 of the key inserted and turned in the casing, it will be evident that the character printed upon the column $x^3$ of the record strip will serve to identify the person whose key is used in recording the operation of the measuring instrument.

Upon the end of the shaft 31 opposite to its slotted opening 32 is secured a disk member 40 having cam projections 41, 41 at diametrically opposite sides, each of which affords a shoulder $41^a$ at one side capable of engagement behind a pendent part 50 produced at the extremity of a dog 42 fulcrumed at 43 and adapted to prevent back rotation of said shaft 31 while permitting the same to be turned freely in the direction indicated by the arrow in Fig. 6. 44 represents a spring or equivalent yielding connection interposed between said disk member 40 and a similar disk member 45 secured upon one end of a sleeve 46 which is mounted for turning movement upon the central portion of shaft 31, and is provided with similar cam disks 47, 47 positioned in front of and in alinement with certain of the vertically directed arms of the yoke member 25 so as to be capable of operation upon said yoke member through cam projections 51, 51 carried upon said respective disks 47, 47, to press the yoke member rearwardly so that the stylus 19 and type wheel 24 may be impressed upon the record sheet or strip to produce a record of the result of the operation of the measuring instrument to which the improved recording mechanism is applied for use, as heretofore explained.

The disk member 45 is likewise provided with shoulders 48, 48 diametrically opposite one another and capable of engagement with a dog 49 connected for movement in unison with the dog or detent 42, the construction and arrangement of the parts being such that when the dog 42 stands in lowered position as indicated in Fig. 6, permitting free forward rotation of shaft 31 in the direction indicated by the arrow in that figure, the dog 49 connected therewith also stands in lowered position as shown in Fig. 5, and operates to prevent rotative movement of the sleeve 46 wherewith the disk member 45 is connected during the initial rotatory movement imparted by the key to the shaft 31 to rotate said disk member 40 beneath the dog 42, so that such initial rotatory movement imparted to said shaft 31 operates upon the spring connection 44 to place the same under tension as will be readily understood. The cam projections 51, 51 upon the cam disks 47, 47 of the sleeve 46 are also diametrically opposite each other, and the structure and arrangement of the parts is such that in the normal inactive position of the mechanism one of the cam projections 51 of each cam disk 47 stands in position for engagement against the adjacent arm of the forwardly drawn yoke member 25 as clearly shown in Figs. 3 and 6, so as to be operable to force the same rearwardly to impress stylus 19 and type wheel 24 upon the record sheet when said sleeve 46 is rotated under the influence of the inserted key, such rotative movement of said sleeve 46 being however, effectually prevented by the engagement of the lowered dog 49 with one of the shoulders 48 of the disk member 45. When the key is inserted and turned, therefore, its initial turning movement operates to place the spring connection 44 under tension, while the sleeve 46 is held from turning movement so that the yoke member 25 cannot be actuated, but as the movement of the shaft 31 under the influence of the key approaches a half revolution in extent, one of the inclined cam projections 41 on the disk member 40 is caused to engage beneath the forwardly extended pendent extremity 50 of the detent 42, so as to lift the same, and the movement of said detent being communicated to the dog 49, the latter is also lifted out of engagement with the shoulder 48 of the disk member 45 on sleeve 46 so that the spring connection 44 previously placed under tension as heretofore explained is caused to impart a sudden turning movement to said sleeve 46 sufficient to cause the cam projections 51 of the cam disks 47, 47 to engage upon the yoke member 25 and force the latter suddenly rearward to impress the stylus 19 upon the record sheet or strip to record the total result of the operation of the measuring instrument to which the recording mechanism is applied for use, and simultaneously to impress the appropriate impression surface 28 of the type wheel 24 upon said record strip to record the particular person in charge of the measuring instrument when the record is made. After this actuation of the parts, upon further turning movement of shaft 31, the detent 42 again drops by gravity into locking engagement with the shoulder 41ª of the cam projection 41 which operated to lift it, and simultaneously the dog 49 drops into locking engagement with the other shoulder 48 of the disk member 45 of sleeve 46, so as to again lock the sleeve in its normal inactive position ready for renewed operation upon further forward turning of shaft 31 sufficient to tension the spring connection 44 and actuate the releasing mechanism above described. Means may obviously be provided for preventing withdrawal of the key before the completion of such part of a revolution of shaft 31 as may be requisite to return the locking devices to their normal inactive positions. Such means may be similar to that provided for similar purposes in locks of various kinds.

From the above description it will be seen that the improved recording mechanism constructed according to my invention is of an extremely simple and comparatively inexpensive nature, and is particularly well adapted for the purposes for which it is designed in assuring the effective recording of the result of the operation of the measuring instrument to which it is applied for use, and the identification of the attendant in charge of such instrument at the time the record is produced, and it will also be obvious that the device is susceptible of considerable modification without material departure from the principles and spirit of the invention and for this reason I do not desire to be understood as limiting myself to the precise formation and arrangement of the several parts of the mechanism herein set forth in carrying out my invention in practice.

Having thus described my invention, what I claim and desire to secure by Letters Patent is—

1. In mechanism of the character described, the combination of a recording device adapted to produce a record upon a record sheet and adapted to be controlled from a measuring instrument in connection wherewith the mechanism is used, means for actuating said recording device operable to impress said device upon a record sheet, and releasable means coöperating with said actuating means for restraining the recording device from operation.

2. In mechanism of the character described, the combination of a device adapted to produce a record upon a record sheet and adapted to be controlled from a measuring instrument in connection wherewith the mechanism is used, means for actuating said recording device operable to impress said device upon a record sheet and including relatively movable members having a connection adapted to be tensioned during movement of one of such members, and releasable means for restraining the other member of said actuating means during the tensioning of said connection.

3. In mechanism of the character described, the combination of a device adapted to produce a record upon a record sheet and adapted to be controlled from a measuring instrument in connection wherewith the mechanism is used, means adapted to be tensioned and capable of operation to actuate the recording device operable to impress said device upon a record sheet, and means in controlling relation to the actuating means capable of operation first to place the same under tension and afterward to release the same.

4. In mechanism of the character described, the combination of a measuring instrument a device capable of movement from a neutral position to produce a record upon a record strip and controlled from said measuring instrument, and key actuated means for actuating said recording device, and means for returning said recording device to its neutral position after each operation.

5. In mechanism of the character described, the combination of a measuring instrument a device capable of variable reciprocatory movement to produce a record upon a record strip and controlled from said measuring instrument, means adapted to be tensioned and capable of operation to actuate the recording device, and key actuated means in controlling relation to said actuating means.

6. In mechanism of the character described, the combination of a measuring instrument a device capable of variable reciprocatory movement to produce a record upon a record sheet and controlled from said measuring instrument, means adapted to be tensioned capable of operation to actuate the recording device, means for restraining said actuating means, and key controlled means in controlling relation to the restraining means.

7. In mechanism of the character described, the combination of a measuring instrument a device capable of variable reciprocatory movement to produce a record upon a record sheet and controlled from said measuring instrument, means adapted to be tensioned and capable of operation to actuate the recording device, and key controlled means in controlling relation to the actuating means and capable of operation first to place the same under tension and afterward to release the same.

8. In mechanism of the character described, the combination of a measuring instrument a device capable of variable reciprocatory movement to produce a record upon a record sheet, and controlled from said measuring instrument, and key controlled means for actuating the recording device including relatively movable members having a connection adapted to be tensioned during movement of one of the members and operable to drive the other member.

9. In mechanism of the character described, the combination of a device capable of operation to produce a record upon a record sheet and adapted to be controlled from a measuring instrument in connection wherewith the mechanism is used, means for actuating the recording device including relatively movable members having a connection adapted to be tensioned during movement of one of the members, and key controlled means for restraining the other member of said actuating means during the tensioning of said connection.

10. In mechanism of the character described, the combination of a device capable of variable reciprocatory movement to produce a record upon a record sheet and adapted to be controlled from a measuring instrument in connection wherewith the mechanism is used, means controlled from a plurality of keys operable to actuate said recording device, and an auxiliary recording device adapted to be variably actuated from the respective keys.

11. In mechanism of the character described, the combination of a device capable of variable reciprocatory movement to produce a record upon a record sheet and adapted to be controlled from a measuring instrument in connection wherewith the mechanism is used, plural means for actuating said recording device, and an auxiliary recording device adapted to be variably actuated from the several plural actuating means.

12. In mechanism of the character described, the combination of a device capable of variable reciprocatory movement to produce a record upon a record sheet or the like and adapted to be controlled from a measuring instrument in connection wherewith the mechanism is used, key controlled means for actuating the recording device, and an auxiliary recording device including a type wheel having multiple impression surfaces and variably operated from said key controlled actuating means.

13. In mechanism of the character described, the combination of a measuring instrument, a device for producing a record upon a record sheet controlled from the operation of the measuring instrument, manually controlled means for actuating said recording device operable to impress said device upon a record sheet or the like, and an auxiliary recording device also controlled from said actuating means.

14. In mechanism of the character described, the combination of a measuring instrument, a device for producing a record upon a record sheet controlled from the operation of the measuring instrument, means for actuating said recording device operable to impress said device upon a record sheet or the like, variable means in controlling relation to said actuating means, and an auxiliary recording device actuated from said variable controlling means.

In witness whereof I have hereunto signed my name in the presence of two subscribing witnesses.

WILHELM SIMONSSON.

Witnesses:
K. R. MARKEY,
W. E. LAWSON.

Copies of this patent may be obtained for five cents each, by addressing the "Commissioner of Patents, Washington, D. C."